US011933090B2

United States Patent
Moriyama et al.

(10) Patent No.: US 11,933,090 B2
(45) Date of Patent: Mar. 19, 2024

(54) DOOR HANDLE STRUCTURE OF VEHICLE

(71) Applicant: MAZDA MOTOR CORPORATION, Hiroshima (JP)

(72) Inventors: Yukihiro Moriyama, Hiroshima (JP); Eisuke Kuramoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 267 days.

(21) Appl. No.: 17/501,733

(22) Filed: Oct. 14, 2021

(65) Prior Publication Data

US 2022/0243507 A1    Aug. 4, 2022

(30) Foreign Application Priority Data

Feb. 3, 2021    (JP) .................. 2021-015645

(51) Int. Cl.
*E05B 85/10* (2014.01)
*B60J 5/04* (2006.01)
*E05B 85/16* (2014.01)

(52) U.S. Cl.
CPC ........... *E05B 85/107* (2013.01); *B60J 5/0468* (2013.01); *E05B 85/16* (2013.01)

(58) Field of Classification Search
CPC ....... E05B 85/10; E05B 85/103; E05B 85/107
See application file for complete search history.

(56) References Cited

U.S. PATENT DOCUMENTS

| | | | |
|---|---|---|---|
| 6,696,652 B1* | 2/2004 | Spies | E05B 83/16 |
| | | | 200/333 |
| 8,701,353 B2* | 4/2014 | Patel | E05B 85/103 |
| | | | 292/201 |
| 2015/0035296 A9* | 2/2015 | Aerts | E05B 85/107 |
| | | | 292/336.3 |
| 2016/0222702 A1* | 8/2016 | Koizumi | E05B 81/64 |
| 2019/0048623 A1* | 2/2019 | Ehrlich | E05B 85/107 |
| 2019/0112846 A1* | 4/2019 | Laval | E05B 85/107 |
| 2020/0190848 A1 | 6/2020 | Murata et al. | |
| 2021/0017795 A1* | 1/2021 | Grenouillat | E05B 81/74 |

FOREIGN PATENT DOCUMENTS

JP    2020-094455 A    6/2020

OTHER PUBLICATIONS

Merriam-Webster.com Dictionary, s.v. "recess," accessed Aug. 31, 2023, https://www.merriam-webster.com/dictionary/recess. (Year: 2023).*

* cited by examiner

*Primary Examiner* — Christine M Mills
*Assistant Examiner* — Emily G. Brown
(74) *Attorney, Agent, or Firm* — Studebaker & Brackett PC

(57) ABSTRACT

There are provided a hinge arm having a lever and a rotational axis to rotate the lever so as to be projected from the door panel, and a driving unit to transmit a drive force to the hinge arm so as to project the lever from the door panel. The driving unit comprises a motor and an output axis connected to the motor and the hinge arm so as to transmit a motor output to the hinge arm in a region from a storage position to an open position, wherein the drive force is transmitted from the motor to the hinge arm via the output axis when the lever is moved from the storage position to a gripping position and the drive force is transmitted from the hinge arm to the motor via the output axis when the lever is moved from the open position to the gripping position.

7 Claims, 22 Drawing Sheets

DOOR HANDLE STRUCTURE OF VEHICLE

BACKGROUND OF THE INVENTION

The present invention relates to a door handle structure of a vehicle, in which a door handle lever and a door outer panel are configured to be flush with each other when the door handle lever is stored.

Conventionally, as disclosed in Japanese Patent Laid-Open Publication No. 2020-94455 (US Patent Application Publication No. 2020/0190848 A1), a door handle structure of a vehicle having a flush surface structure in which a door handle lever (a so-called handle) is stored in such a manner that the door handle lever is flush with a door outer panel is known.

The door handle structure of the vehicle disclosed in the above-described patent document is a seesaw type of door handle structure in which the door handle lever is supported by an axis extending in a vertical direction, the door handle lever is biased in a storage direction by a spring provided at this axis, and the door handle lever is projected by operating a convex portion which is provided closely to the axis of the door handle lever by an alternate mechanism.

Further, the door handle structure of the vehicle disclosed in the above-described patent document is configured such that a switch is provided at a vehicle inward side of the door handle lever which takes a storage position, the door hand lever is projected by a driving unit which is driven by this switch, and the door handle lever is stored in its storage position by using a biasing force of the spring.

Herein, there is a problem in that in a case where when the door handle lever taking an open position is returned to the storage position by a biasing force of the spring, its returning action is too hard, the door handle lever may be projected again by the driving unit because the above-described switch is improperly pushed by the returned door handle lever. Moreover, because hitting noise may occur when the door handle lever hits against the switch, there is another problem in that the visual or auditory quality may be deteriorated.

SUMMARY OF THE INVENTION

Accordingly, an object of the present invention is to provide a door handle structure of a vehicle which can properly prevent an erroneous operation (malfunction) of the driving unit and improve the visual/auditory quality of its operational state.

The present invention is a door handle structure of a vehicle, comprising a hinge arm having a lever which is retractable from a door panel at one end thereof and a rotational axis to rotate the lever so as to be projected from the door panel, and a driving unit to transmit a drive force to the hinge arm so as to project the lever from the door panel, wherein the lever is configured to be rotatable among a storage position where the lever is flush with the door panel, a gripping position where the lever is projected from the door panel by the driving unit so that a user is able to grip the lever, and an open position where the lever is further projected from the gripping position, the lever is biased in a storage direction by a biasing mechanism which is provided at the rotational axis, a switch which is electrically connected to the driving unit is provided to closely face a vehicle inward side of the lever taking the storage position, the driving unit comprises a motor and an output axis which is connected to the motor and the hinge arm so as to transmit an output of the motor to the hinge arm in a region from the storage position to the open position, and the driving unit is configured such that a drive force is transmitted from the motor to the hinge arm via the output axis when the lever is moved from the storage position to the gripping position and the drive force is transmitted from the hinge arm to the motor via the output axis when the lever is moved from the open position to the gripping position.

According to the present invention, the drive force is transmitted from the hinge arm to the motor via the output axis when the lever is moved from the open position to the gripping position. Thereby, a rotational torque is applied to the motor and the motor is rotated, thereby generating an electrical brake force, so that braking can be applied against the biasing force of the biasing mechanism which biases the lever in the storage direction.

Consequently, a returning speed of the lever when the lever is returned to the storage position is reduced and thereby a load (impact) which is inputted to the switch is reduced, so that the erroneous operation (malfunction) of the driving unit can be prevented and the visual/auditory quality of its operational state can be improved. Herein, the visual/auditory quality of the operational state means a smooth movement without the hitting noise or vibration. Further, the electrical brake force means a torque which is generated in a direction opposite to the rotational direction of the motor when a voltage is generated between motor terminals by the rotation of the motor, which is caused by an induced electromotive force, and by forming a closed circuit with connecting the both terminals, thereby making an electrical current flow in the circuit.

In an embodiment of the present invention, the hinge arm has the driving unit at the other end thereof via the rotational axis, and there are provided a bracket which rotatably supports the hinge arm via the rotational support axis, a sector gear which is fixed to the bracket, and a pinion gear into which the output axis is fitted and which engages with the sector gear.

According to this embodiment, a motor power can be transmitted to the hinge arm by engagement of the gears, i.e., the sector gear and the pinion gear. Further, by proving the lever at the one end of the hinge arm and providing the driving unit at the other end of the hinge arm, the motor can be made to serve as a counterweight against the lever.

In another embodiment of the present invention, a bracket rotatably supporting the hinge arm via the rotational support axis is provided, the driving unit comprises a crank which is fixed to the output axis at a base end thereof and has a slide member at a free end thereof, and a guide portion to guide a moving path of the slide member is provided at the bracket.

A roller which is provided at the free end of the crank may be used as the above-described slide member, and a guide groove or a guide groove formed by a rib may be used as the above-described guide portion.

According to this embodiment, since the slide member of the crank is guided by the guide portion, the slide member moves on the same moving path in a lever projected state where the lever is moved from the storage position to the open position by way of the gripping position and in a lever stored state where the lever is moved from the open position to the storage position by way of the gripping position. Thereby, a rotational force can be applied to the output axis.

In another embodiment of the present invention, a temporary holding mechanism to temporarily hold the hinge arm at the gripping position of the lever is provided.

According to this embodiment, since the hinge arm can be temporarily held at the gripping position without continuously driving the motor, burden of the motor can be reduced.

In another embodiment of the present invention, both of the hinge arm and the sector gear are provided at the rotational axis.

According to this embodiment, positioning of the hinge arm and the sector gear becomes accurate, so that the hinge arm can be driven securely.

The other useful embodiments of the present invention will become apparent from the following description which refers to the accompanying drawings.

DETAILED DESCRIPTION OF THE INVENTION

Embodiment 1

Figure 2:
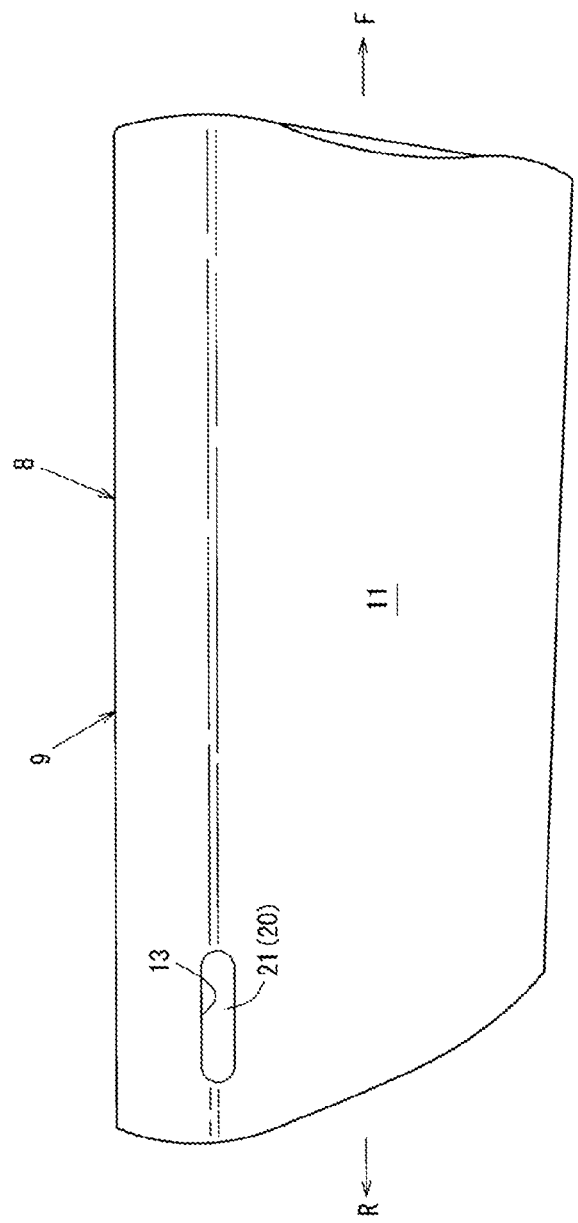
FIG. 2 is a major-part enlarged side view of FIG. 1.
Figure 3:
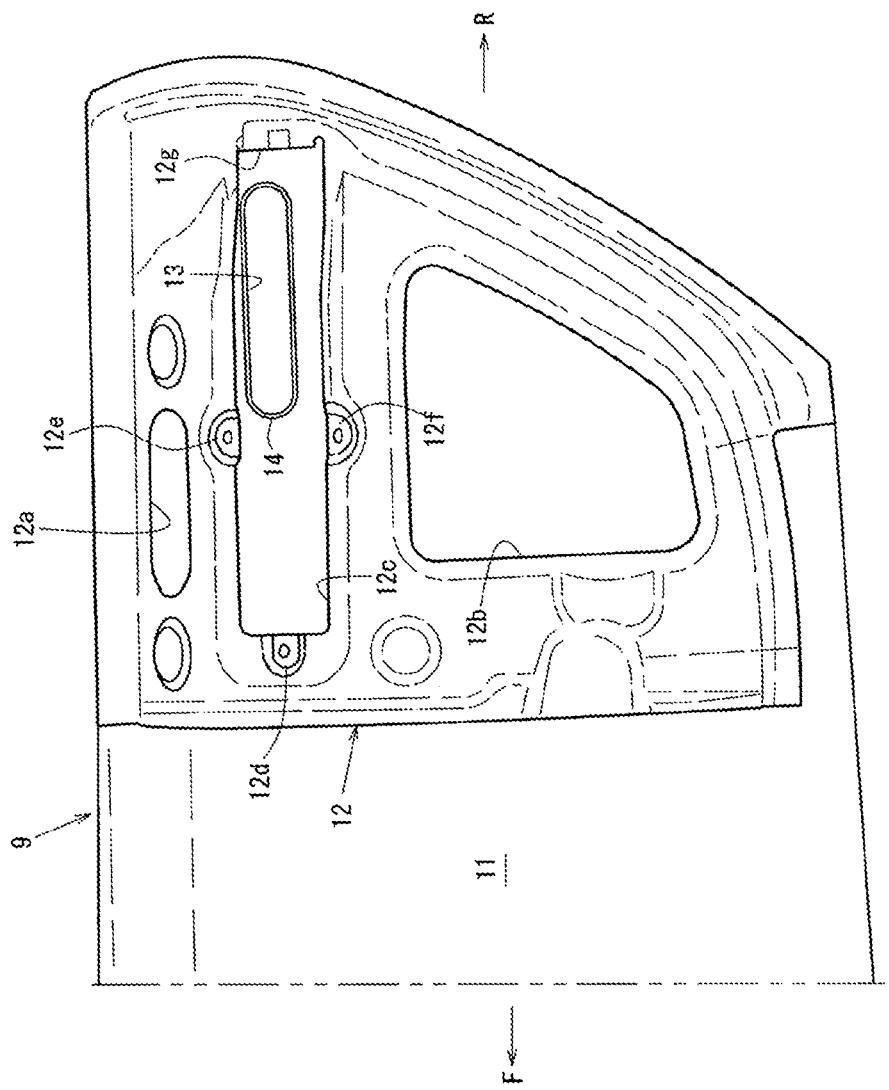
FIG. 3 is an inner side view showing an arrangement structure of a reinforcement.

The first embodiment of the present invention will be described specifically referring to the drawings. The drawings show a door handle structure of the vehicle, and FIG. 1 is a side view of a vehicle which has the present door handle structure, FIG. 2 is a major-part enlarged side view of FIG. 1, and FIG. 3 is an inner side view showing an arrangement structure of a reinforcement.

In the figures, an arrow F shows a vehicle forward side, an arrow R show a vehicle rearward side, an arrow UP shows a vehicle upward side, and an arrow OUT shows an outward side, in a vehicle width direction. While the door handle structure of the vehicle of the present invention is applicable to a front door, a rear door, a lift gate or the like of a four-door type of vehicle, an application structure to a door of a two-door type of vehicle will be described specifically in the following embodiments.

Figure 1:
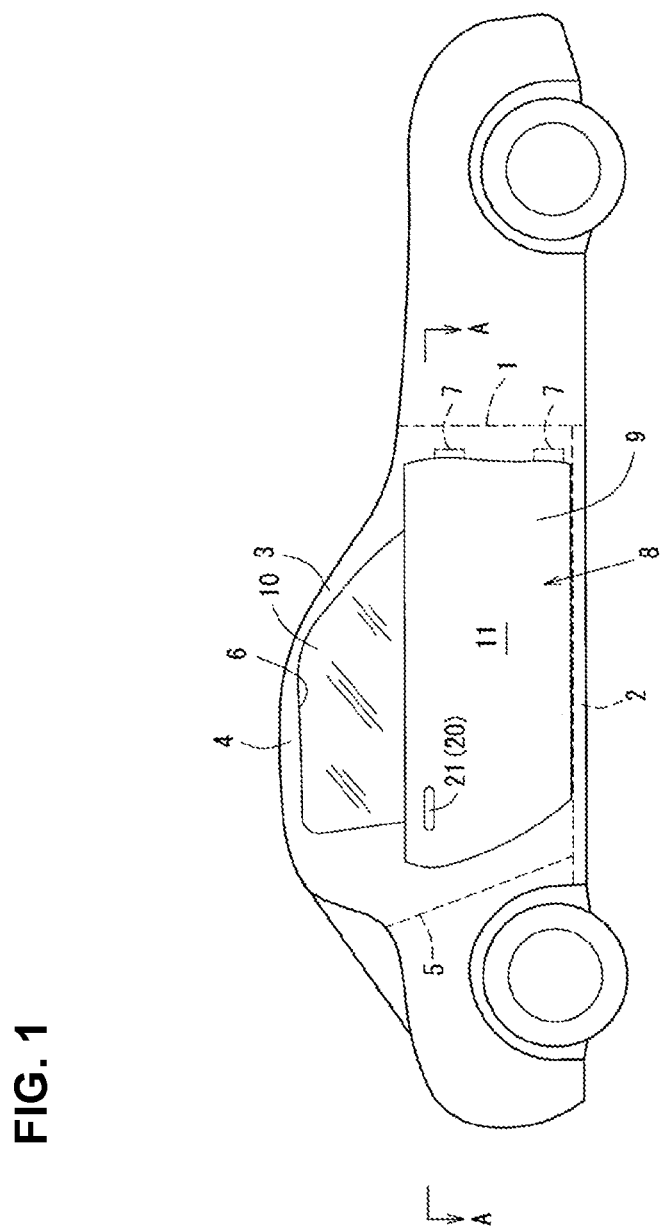
FIG. 1 is a side view of a vehicle which has a door handle structure of the present invention.

As shown in FIG. 1, the vehicle comprises a hinge pillar 1 which extends in a vertical direction at a front portion of a cabin, a side sill 2 which extends in a vehicle longitudinal direction at a vehicle lower portion, a front pillar 3 which extends obliquely rearwardly-and-upwardly from an upper end of the hinge pillar 1, a roof side rail 4 which rearwardly extends continuously from a rear end of the front pillar 3, and a rear pillar 5 which interconnects substantially vertically the roof side rail 4 and the side sill 2.

A door opening portion 6 which is partitioned by the hinge pillar 1, the side sill 2, the front pillar 3, the roof side rail 4, and the rear pillar 5 is formed. The door opening portion 6 is closed or opened with a side door 8 which is rotatably attached to the hinge pillar 1 via a pair of upper-and-lower door hinges 7, 7.

As shown in FIGS. 1 and 2, the side door 8 comprises a door body 9 and a door window glass 10 as a door window member, and as shown in FIGS. 2 and 3, the door body 9 comprises a door outer panel 11, a door inner panel (not illustrated), and a reinforcement 12 which is provided on an inward side, in the vehicle width direction, of the door outer panel 11 and at a rear side of the door body 9. In the present embodiment, the door panel is constituted by the door outer panel 11 and the reinforcement 12.

As shown in FIG. 3, at an upper-rear side of the door outer panel 11 as the door panel are provided an opening portion 13 (lever opening portion) which stores a lever 20, which will be described later, and a flange 14 which is formed by bending an edge portion of the opening portion 13 over its entire periphery by baring processing.

Further, as shown in FIG. 3, an upper opening 12a and a lower opening 12b are respectively formed at an upper side and a lower side of the reinforcement 12, and an opening portion 12c (bracket opening portion) for attaching a bracket 50, which will be described later, is formed between the both openings 12a, 12b.

Figure 4:
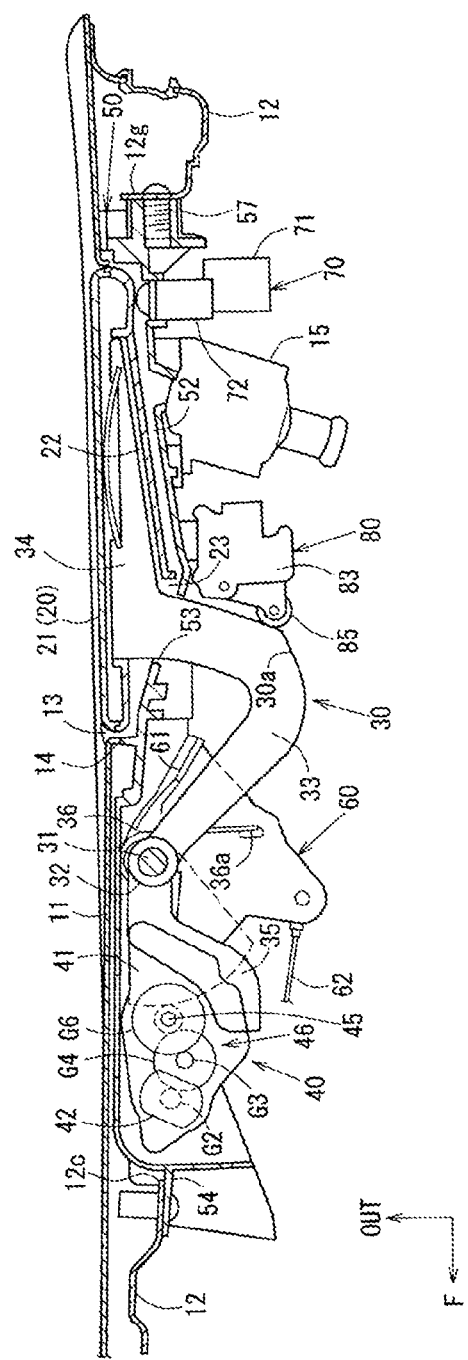
FIG. 4 is a sectional view taken along line A-A of FIG. 1, which shows a storage position of a lever.
Figure 5:
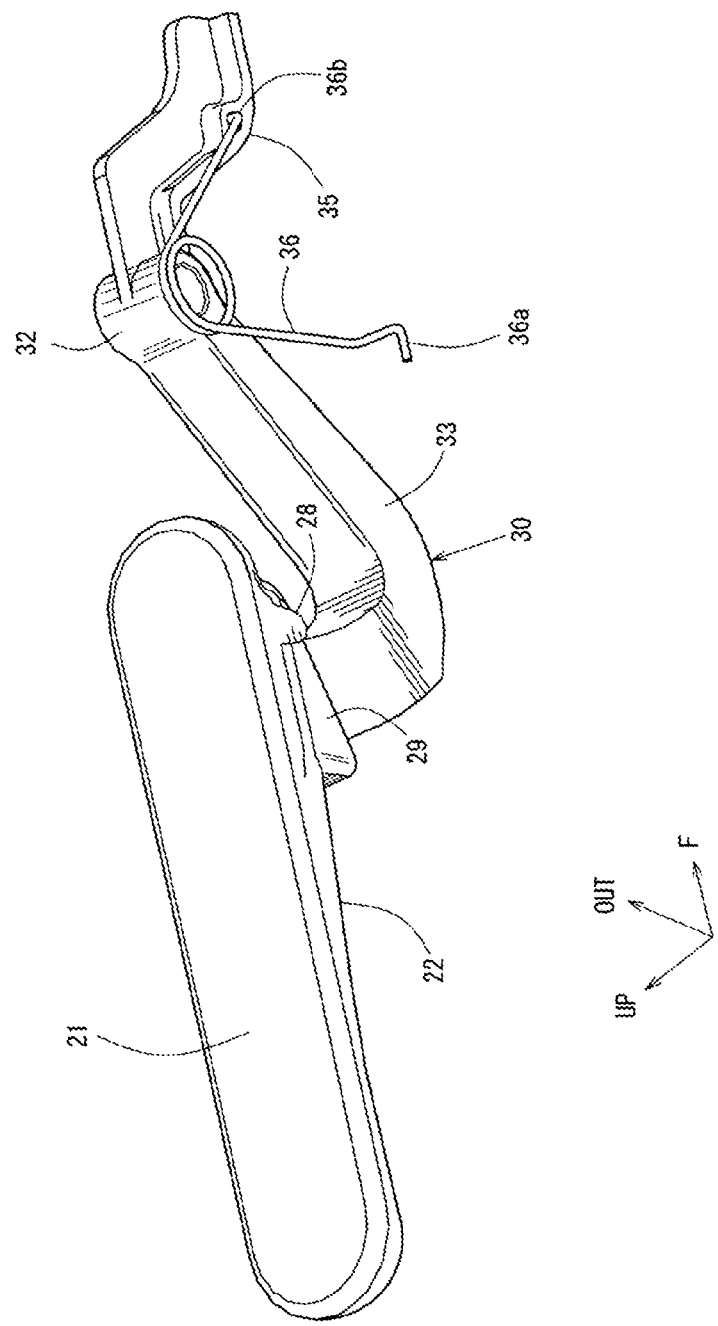
FIG. 5 is a perspective view of the lever and a hinge arm.
Figure 6:
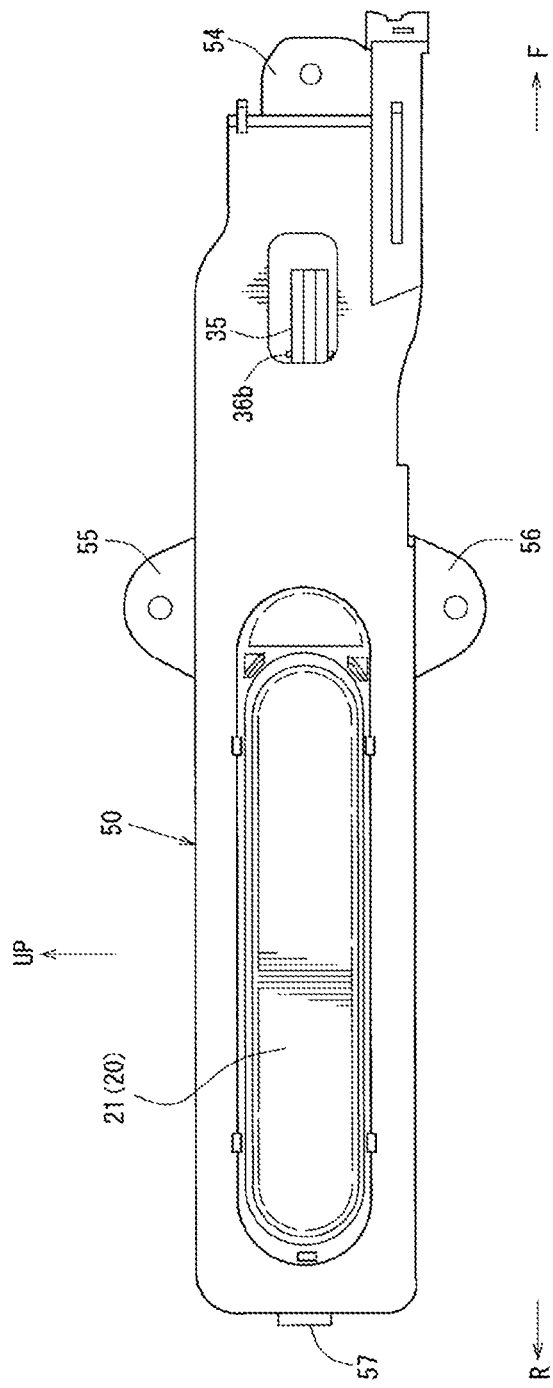
FIG. 6 is an outer side view of a bracket including the lever.

FIG. 4 is a sectional view taken along line A-A of FIG. 1, which shows a storage position of the lever 20, FIG. 5 is a perspective view of the lever 20 and a hinge arm 30, and FIG. 6 is an outer side view of the bracket 50 including the lever 20.

Figure 7:
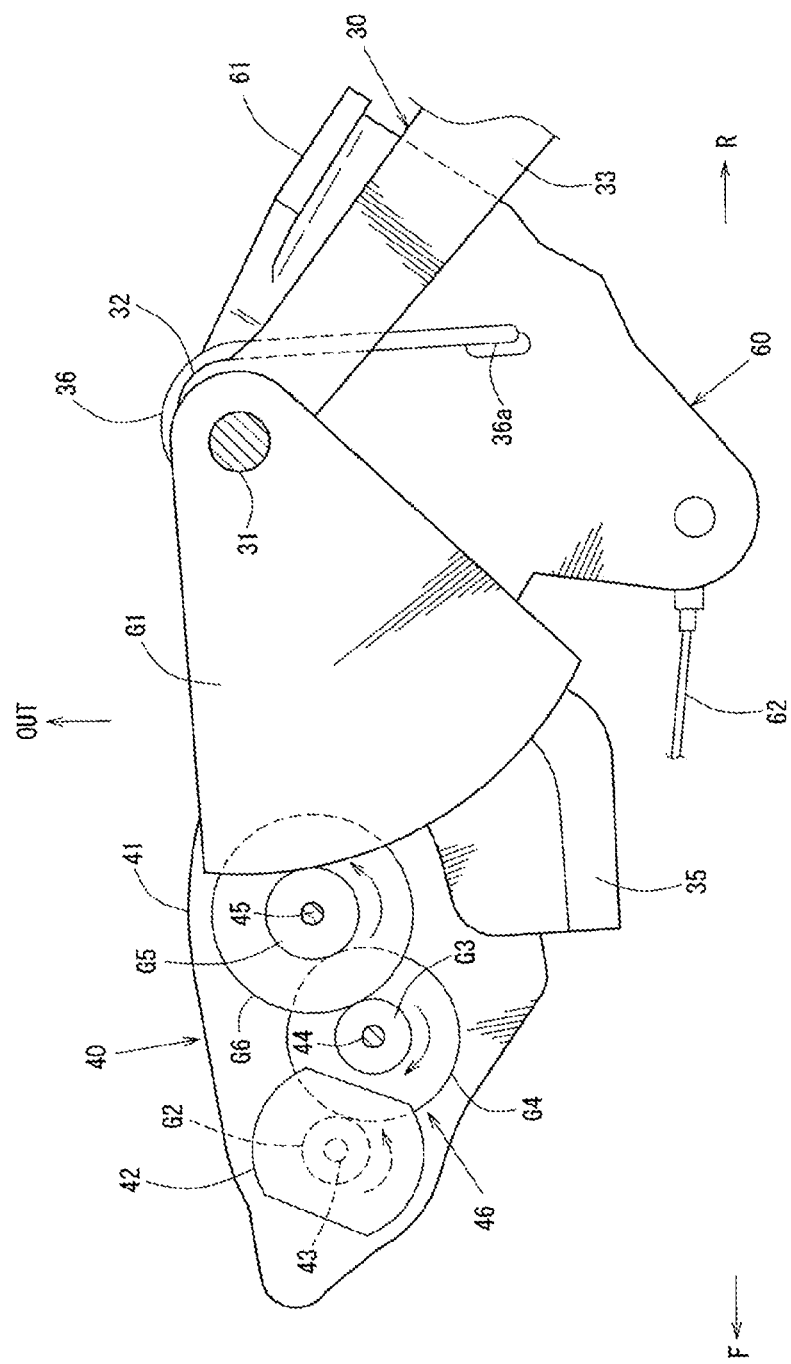
FIG. 7 is a plan view showing a driving unit.
Figure 8:
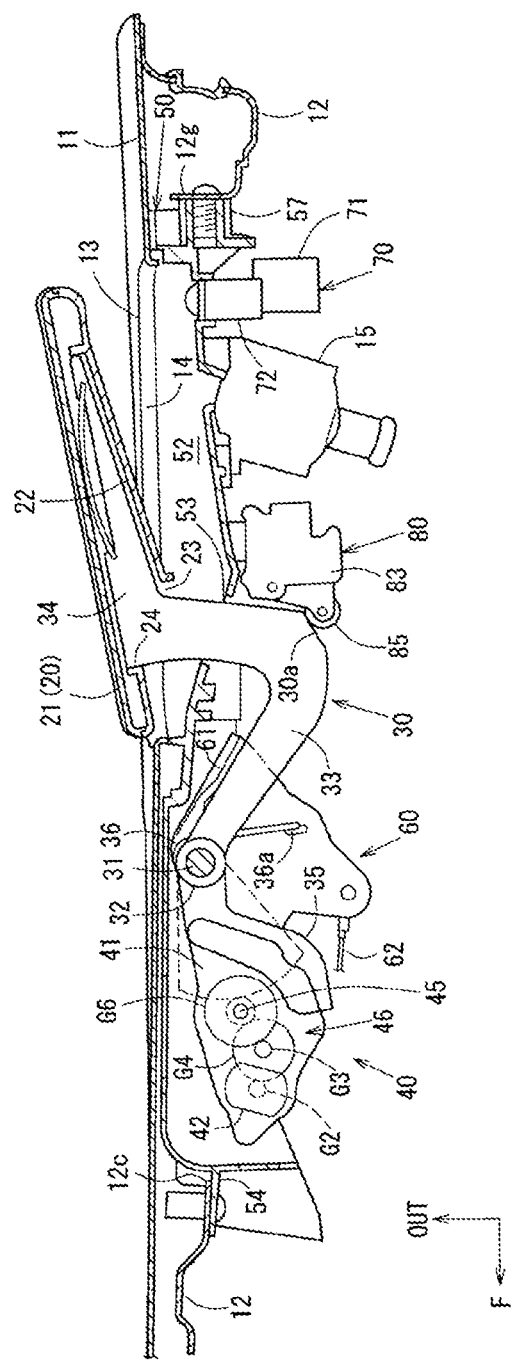
FIG. 8 is a plan view showing a gripping position of the lever.
Figure 9:
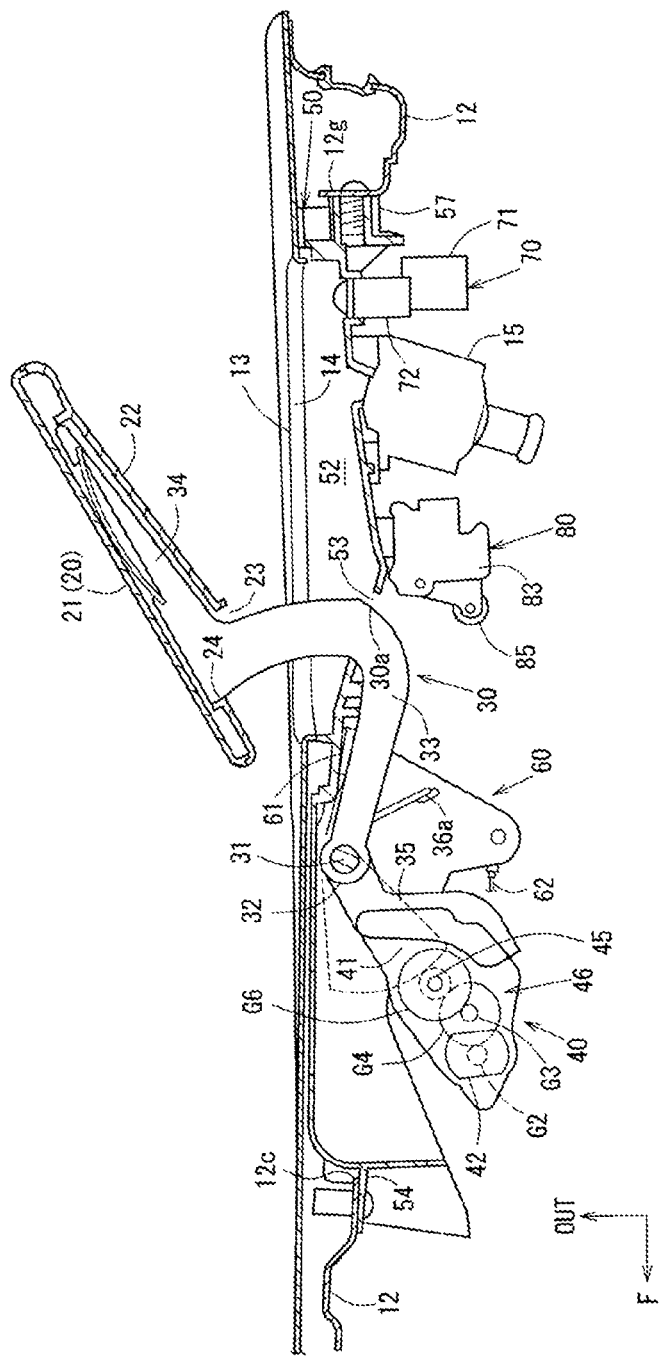
FIG. 9 is a plan view showing an open position of the lever.
Figure 10:
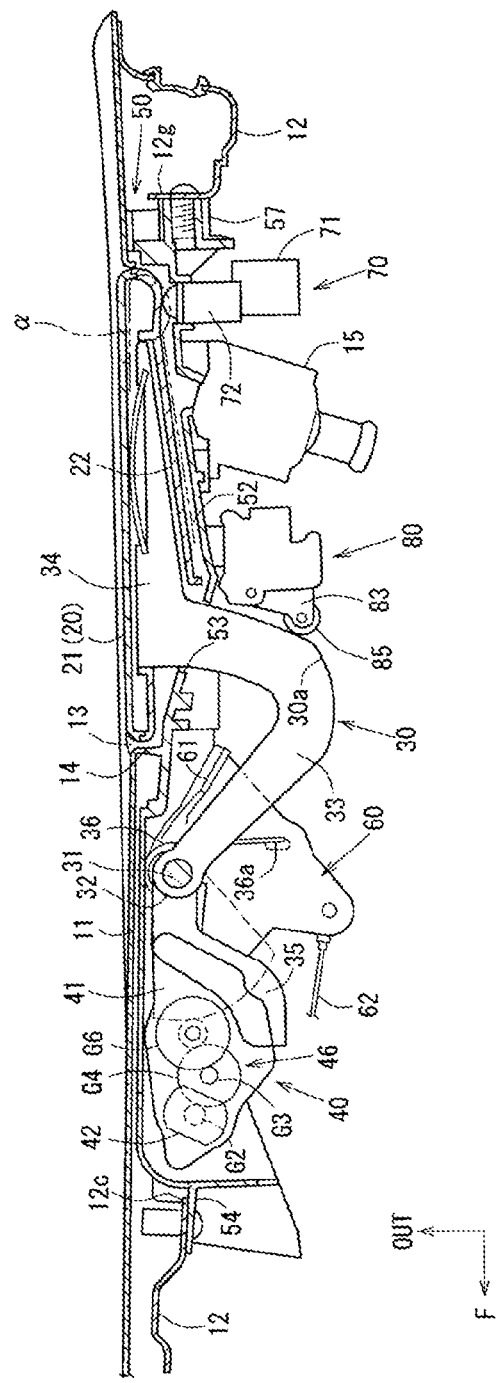
FIG. 10 is a plan view showing a pushing position of a switch by using an imaginary line.

Further, FIG. 7 is a plan view showing a driving unit 40, FIG. 8 is a plan view showing a gripping position of the lever 20, FIG. 9 is a plan view showing an open position of the lever 20, and FIG. 10 is a plan view showing a pushing position of a switch 70 by using an imaginary line α.

As shown in FIG. 4, the present door handle structure of the vehicle comprises the lever 20 (specifically, door handle lever) which is retractable from the opening portion 13 of the door outer panel 11 as the door panel, a swan-neck type of hinge arm 30 with the lever 20, and the driving unit 40 to transmit a drive force to the hinge arm 30 so as to project the lever 20 from the door outer panel 11. Further, there is provided the bracket 50 which is fixed to the reinforcement 12 as a door panel so as to store the lever 20 therein.

The lever 20 is formed by an outer cover 21 shown in FIGS. 4 and 5 and an inner cover 22 which are fitted together in a convex/concave connection manner or fixedly joined together at their peripheral edge portions, and the lever 20 and the opening portion 13 of the door outer panel 11 are respectively formed in an elongated circular shape which is relatively-long in a vehicle longitudinal direction in a side view.

As shown in FIG. 5, a protrusion portion 28 is formed at a front side of an opening 23 (see FIG. 4) where the hinge arm 30 provided outside of the inner cover 22 is inserted. This protrusion portion 28 is of a tongue-piece shape and configured to contact a facing wall (not illustrated) of the bracket 50 and function as a fulcrum in a swinging action of the lever 20.

Further, as shown in FIG. 5, a cylindrical portion 29 which is spaced apart from the hinge arm 30 and encloses the hinge arm 30 is formed at an inward side, in the vehicle width direction, of the opening 23 (see FIG. 4). As show in FIG. 4, the hinge arm 30 has the above-described lever 20 at its one end (its rear end in the present embodiment), and is provided with a hinge pin 31 as a rotational support axis around which the lever 20 is rotated in such a manner that the lever 20 is projected from the door outer panel 11. This hinge pin 31 is fixed to the bracket 50 such that it extends in the vertical direction.

Moreover, as shown in FIG. 4, the hinge arm 30 comprises a pivotal portion 32 to pivotally support the hinge pin 31, a lever support portion 34 which extends rearwardly from the pivotal portion 32 via a swan-neck shaped neck portion 33, and an extension portion 35 which extends forwardly, in an opposite direction to the neck portion 33, from the pivotal portion 32 via the swan-neck shaped neck portion 33, which are formed integrally. The lever support portion 34 is arranged inside the lever 20 which is formed by the outer cover 21 and the inner cover 22.

As shown in FIG. 4, a motor base 41 for assembling the driving unit 40 is attached to the extension portion 35 of the hinge arm 30. Also, as shown in FIG. 4, a crank plate 60 is provided coaxially with the hinge pin 31. A vertical wall 61 which contacts and engages with the neck portion 33 of the hinge arm 30 when the lever 20 and the hinge arm 30 are rotated at the gripping position (see FIG. 8) is integrally formed at an rearward-and-outward side, in the vehicle width direction, of the crank plate 60.

Moreover, a release wire 62 for releasing a door latch (not illustrated) is fixed to an inward end, in the vehicle width direction, of the crank plate 60. This crank plate 60 is always biased in an anti-release direction by means of a coil spring (not illustrated) having a large spring force.

Meanwhile, a torsion spring 36 as a biasing mechanism is wound around the hinge pin 31. One end 36a of the torsion spring 36 engages with the crank plate 60 shown in FIG. 4, and the other end 36b of the torsion spring 36 engages with the extension portion 35 of the hinge arm 30 as shown in FIG. 5. Thereby, the lever 20 is always biased in its storage direction by means of the torsion spring 36. A spring force of this torsion spring 36 is set to be smaller than that of the coil spring (not illustrated) which biases the crank plate 60 in the anti-release direction.

Next, a structure of the driving unit 40 to transmit the drive force to the other side (see the extension portion 35) of the hinge arm 30 will be described referring to FIG. 7. The driving unit 40 has a sector gear G1 which is fixed coaxially with the hinge pin 31. The hinge pin 31 is fitted into this sector gear G1, and the sector gear G1 is attached to the above-described bracket 50 so as not to change its position.

A motor 42 is attached to the motor base 41. A rotational axis 43 of the motor 42 is fitted into an output gear G2. An idle gear G4 having a pinion gear G3 is provided at an axis 44 which is provided at the motor base 41. Further, a driven gear G6 having a pinion gear G5 is provided at another axis 45 which is provided at the motor base 41. The above-described output axis 45 is an axis to transmit an output of the motor 42 to the hinge arm 30 via the pinion gear G5.

As shown in FIG. 7, the output gear G2 engages with the idle gear G4. The pinion gear G3 engages with the driven gear G6. The pinion gear G5 engages with the sector gear G1. Thereby, when the motor 42 is driven and the rotational axis 43 and the output gear G2 are rotated in a counterclockwise direction in FIG. 7, the pinion gear G5 is finally rotated in the counterclockwise direction in FIG. 7 through respective rotations of the gears G2, G4, G3, G6 and the output axis 45 provided in this order.

As the pinion gear G5 is rotated in the counterclockwise direction in FIG. 7, a gear train 46 comprising the gears G2-G6, the motor 42, and the motor base 41 move in a projection direction of the lever 20 along an arc shape of the sector gear G1 because the position of the sector gear G1 does not change, so that the lever 20 is projected via the hinge arm 30.

The above-described lever 20 is configured to be rotatable among the storage position (see FIG. 4) where the outer cover 21 of the lever 20 is flush with the door outer panel 11, the gripping position (see FIG. 8) where a whole part of a design surface of the lever 20 is projected from the door outer panel 11 by the driving unit 40 so that a user is able to grip the lever 20, and the open position (see FIG. 9) where the lever 20 is further projected from the gripping position.

The lever 20 can be rotated by the driving unit 40 between the storage position shown in FIG. 4 and the gripping position shown in FIG. 8. Further, the crank plate 60 is biased in the anti-release direction by the coil spring (not illustrated) having the strong spring force, not moving between these positions.

In the gripping position shown in FIG. 8, the lever 20 is projected outwardly from the door outer panel 11 so that the user can grip the lever 20, so that the lever 20 can be moved by the user from the gipping position shown in FIG. 8 to the open position shown in FIG. 9.

When the hinge arm 30 reaches the gripping position as shown in FIG. 8, the neck portion 33 of the hinge arm 30 contacts the vertical wall 61 of the crank plate 60. Accordingly, as the lever is rotated in an open direction of the lever 20 against the spring force of the coil spring, not illustrated, the crank plate 60 is moved in a release direction, thereby releasing the door latch via the release wire 62.

Herein, as shown in FIG. 4, the bracket 50 has a storage space 52 of the lever 20 which is inserted into the opening portion 13 and an insertion hole 53 of the hinge arm 30. Further, as shown in FIG. 6, the bracket 50 comprises a front-side attachment portion 54, an upper-side attachment portion 55, a lower-side attachment portion 56, and a rear-side attachment portion 57.

As shown in FIGS. 6 and 3, the front-side attachment portion 54 of the bracket 50 is fixedly fastened to a front-side attachment base 12d provided at a peripheral edge of the opening portion 12c of the reinforcement 12. Likewise, the upper-side and lower-side attachment portions 55, 56 are fixedly fastened to an upper-side attachment base 12e and a lower-side attachment base 12f which are provided at the peripheral edge of the opening portion 12c of the reinforcement 12.

As shown in FIGS. 3 and 4, an erected portion 12g which extends outwardly is integrally formed at a rear-side periphery of the opening portion 12c of the reinforcement 12, and the rear-side attachment portion 57 of the bracket 50 which is shown in FIG. 7 is fixedly fastened to the erected portion 12g.

Meanwhile, as shown in FIG. 4, a switch 70 is arranged at a vehicle inward side of the lever 20 taking the storage position, specifically, at an inward side, in the vehicle width direction, of a rear-end side of the bracket 50 which faces a rear end portion of the inner cover 22. This switch 70 is electrically connected to the motor 42 via a control unit and configured to be turned ON when being pushed by operation, thereby feeding the electricity to the motor 42.

Figure 12:
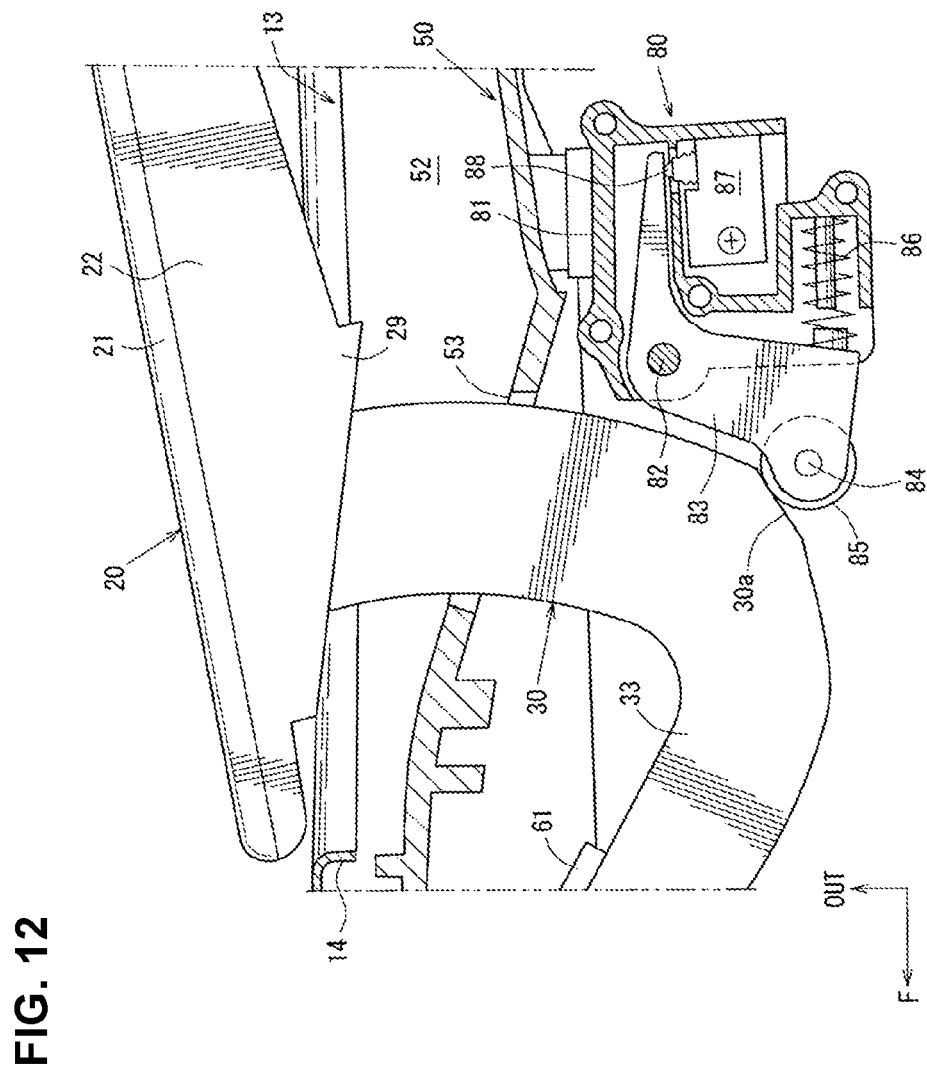
FIG. 12 is an enlarged sectional view of a temporary-holding-mechanism arrangement portion of FIG. 8.

Further, a key cylinder 15 is, as shown in FIG. 4, arranged at the bracket 50 which is forwardly close to the switch 70. Further, as shown in FIG. 4, in the storage position of the lever 20, a temporary holding mechanism 80 to temporarily hold the hinge arm 30 at the gripping position shown in FIG. 12 is arranged at a specified position of the bracket 50 between the neck portion 33 of the hinge arm 30 and the key cylinder 15.

As shown in FIG. 10, since the lever 20 is configured to be swingable relative to the lever support portion 34 of the hinge arm 30, when the rear end portion of the lever 20 positioned in the storage position is pushed from an outward side, the rear end portion of the lever 20 is moved so as to swing inwardly, in the vehicle width direction, as shown by an imaginary line α in FIG. 10, so that a switch pushing position where the switch 70 is turned ON is taken.

That is, there are provided the hinge arm 31 which has the lever 20 retractable from the door outer panel 11 at its one end and the hinge pin 31 to rotate the lever 20 so as to be projected from the door outer panel 11, and the driving unit 40 to transmit the drive force to the hinge arm 30 so as to project the lever 20 from the door outer panel 11. Further, this lever 20 is configured to be rotatable among the storage position (see FIG. 4) where the lever 20 is flush with the door outer panel 11, the gripping position (see FIG. 8) where the lever 20 is projected from the door outer panel 11 by the driving unit 40 so that the user is able to grip the lever 20, and the open position (see FIG. 9) where the lever 20 is further projected from the gripping position. Moreover, the lever 20 is biased in the storage direction by the torsion spring 36 which is provided at the hinge pin 31, and the switch 70 which is electrically connected to the driving unit 40 is provided to closely face the vehicle inward side of the lever 20 taking the storage position.

As shown in FIG. 7, the driving unit 40 comprises the motor 42 and the output axis 45 to transmit the output of the motor 42 to the hinge arm 30, and the driving unit 40 is configured such that the drive force is transmitted from the motor 42 to the hinge arm 30 via the output axis 45 when the lever 20 is moved from the storage position shown in FIG. 4 to the gripping position shown in FIG. 8.

Meanwhile, when the lever 20 is moved from the open position shown in FIG. 9 to the gripping position shown in FIG. 8, the driving unit 40 is configured such that the drive force is transmitted from the hinge arm 30 to the motor 42 via the output axis 45. Specifically, when the lever 20 is moved from the open position to the gripping position, the drive force is transmitted to the motor 42 by way of the respective elements 35, 41, G5, G6, G3, 44, G4, G2, 43 shown in FIG. 7 in this order.

Thus, the drive force is transmitted from the hinge arm 30 to the motor 42 via the output axis 45 when the lever 20 is moved from the open position to the gripping position. Thereby, since a rotational torque is applied to the motor 42 and a voltage is generated at the motor 42, thereby generating a resistance, so that braking can be applied against the biasing force of the torsion spring 36 which biases the lever 20 in the storage direction. Consequently, a moving speed (returning speed) of the lever 20 is reduced and thereby a load which is inputted to the switch 70 is reduced, so that the erroneous operation (malfunction) of the driving unit (the motor 42 in particular) is prevented.

Further, as shown in FIGS. 4 and 7, the hinge arm 30 has the lever 20 at its one end and also has the driving unit 40 at the other end via the hinge pin 31 as the rotational axis, and there are provided the bracket 50 which rotatably supports the hinge arm 30 via the hinge pin 31, the sector gear G1 which is fixed to the bracket 50, and the pinion gear G5 into which the output axis 45 is fitted and which engages with the sector gear G1.

Thereby, a motor power is transmitted to the hinge arm 30 by engagement of the gears, i.e., the sector gear G1 and the pinion gear G5. Further, by proving the lever 20 at the one end of the hinge arm 30 and providing the driving unit (the motor 42 in particular) at the other end of the hinge arm 30, the motor 20 is made to serve as a counterweight against the lever 20.

Figure 11:
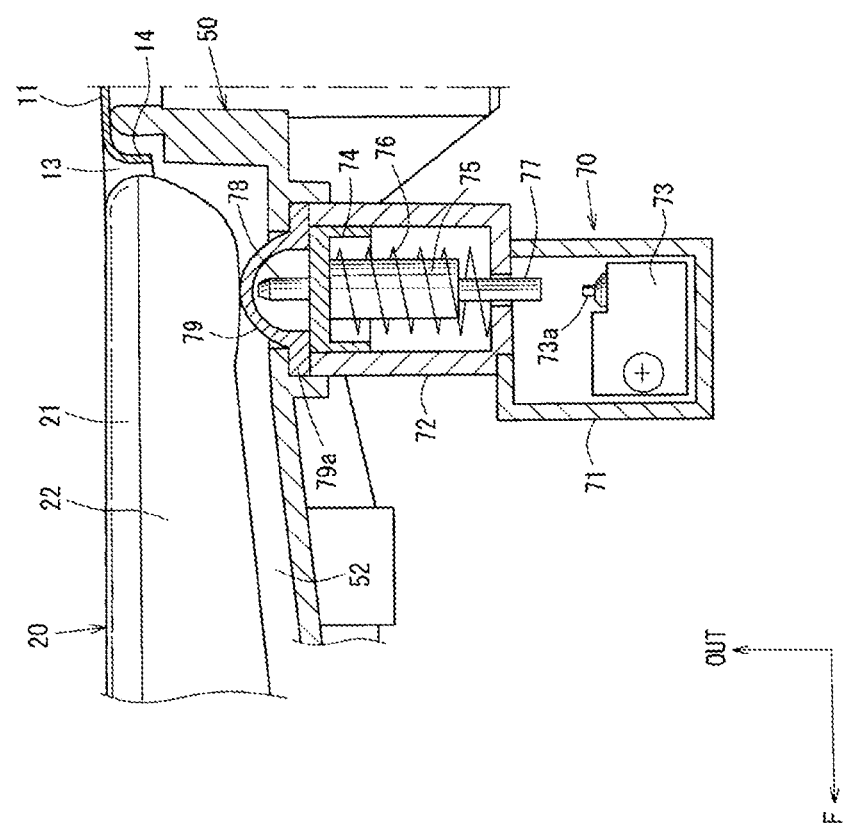
FIG. 11 is an enlarged sectional view of a switch arrangement portion of FIG. 4.

FIG. 11 is an enlarged sectional view of a switch arrangement portion of FIG. 4. As shown in this figure, the switch 70 comprises an inner-side housing 71 and an outer-side housing 72. The inner-side housing 71 stores a switch body 73, and the outer-side housing 72 stores a piston 74, a spring guide 75 which axially moves together with the piston 74, and a spring 76 which always biases the piston 74 outwardly.

A switching rod 77 is integrally provided at a side of the switch body 73 of the spring guide 75, and a pin 78 is integrally provided at a side of the lever 20 of the piston 74. Further, a bumper rubber 79 which covers over the pin 78 is provided, and a flange portion 79a of the bumper rubber 79 is fixedly interposed between the bracket 50 and the outer-side housing 72.

In the storage position of the lever 20, the switching rod 77 and a push rod 73a of the switch body 73 are separated from each other. When the lever 20 is operated to the switch pushing position (see the imaginary line α in FIG. 10), the piston 74, the spring guide 75, and the switching rod 77 are pushed via the bumper rubber 79 against the biasing force of the spring 76, thereby pushing down the push rod 73a by means of the switching rod 77, so that the switch body 73 is turned ON.

FIG. 12 is an enlarged sectional view of a temporary-holding-mechanism arrangement portion of FIG. 8. A temporary holding mechanism 80 which holds the hinge arm 30 at the gripping position (see FIG. 8) of the lever 20 is constituted as follows.

That is, the temporary holding mechanism 80 comprises a housing 81, and an arm portion 83 is pivotally supported at the housing 81 via a support axis 82. A roller 85 is provided at one end of the arm portion 83 via a roller axis 84.

Further, a spring 86 which always biases the roller 85 in its projection direction is provided between a one-end side of the arm portion 83 and the housing 81. Moreover, a switch portion 87 as a position detecting mechanism is located at a position which corresponds to an other-end side of the arm portion 83.

In the storage position of the lever 20 shown in FIG. 4, the roller 85 is pushed by the hinge arm 30 against the biasing force of the spring 86, and the other end of the arm portion 83 is apart from the push rod 88 of the switch portion 87 (an OFF state of the switch portion 87).

As shown in FIGS. 8 and 12, when the lever 20 is projected to the gripping position, the roller 85 is made, by the biasing force of the spring 86, to project to a recess-shaped curvature portion 30a which is positioned at a middle of the hinge arm 30, and the arm portion 83 is rotated, whereby the hinge arm 30 is temporarily held by the rolling roller 85 and the arm portion 83. Concurrently, the push rod 88 of the switch portion 87 is pushed down by the other-end portion of the arm portion 83, whereby the switch portion 87 is turned ON. By providing the above-described temporary holding mechanism 80, the hinge arm 30 is temporarily held at the gripping position without continuously driving the motor 42.

As described above, the door handle structure of the vehicle of the first embodiment shown in FIGS. 1-12 comprises the hinge arm 30 having the lever 20 which is retractable from the door panel (door outer panel 11) at the one end thereof and the rotational axis (hinge pin 31) to rotate the lever 20 so as to be projected from the door panel (door outer panel 11), and the driving unit 40 to transmit the drive force to the hinge arm 30 so as to project the lever 20 from the door panel (door outer panel 11), wherein the lever 20 is configured to be rotatable among the storage position (see FIG. 4) where the lever 20 is flush with the door panel (door outer panel 11), the gripping position (see FIG. 8) where the lever 20 is projected from the door panel (door outer panel 11) by the driving unit 40 so that the user is able to grip the lever 20, and the open position (see FIG. 9) where the lever 20 is further projected from the gripping position, the lever 20 is biased in the storage direction by the biasing mechanism (torsion spring 36) which is provided at the rotational axis (hinge pin 31), the switch 70 which is electrically connected to the driving unit 40 is provided to closely face the vehicle inward side of the lever 20 taking the storage position, the driving unit 40 comprises the motor 42 and the output axis 45 which is connected to the motor 42 and the hinge arm 30 so as to transmit the output of the motor 42 to the hinge arm 30 in a region from the storage position to the open position, and the driving unit 40 is configured such that the drive force is transmitted from the motor 42 to the hinge arm 30 via the output axis 45 when the lever 20 is moved from the storage position to the gripping position and the drive force is transmitted from the hinge arm 30 to the motor 42 via the output axis 45 when the lever 20 is moved from the open position to the gripping position (see FIGS. 4, 7, 8 and 9).

According to this structure, the drive force is transmitted from the hinge arm 30 to the motor 20 by means of the biasing mechanism (torsion spring 36) via the output axis 45 when the lever 20 is moved from the open position to the gripping position. Thereby, the rotational torque is applied to the motor 42 and the motor 42 is rotated, thereby generating the electrical brake force, so that braking can be applied against the biasing force of the biasing mechanism (torsion spring 36) which biases the lever 20 in the storage direction.

Consequently, the returning speed of the lever 20 when the lever 20 is returned to the storage position is reduced and thereby the load (impact) which is inputted to the switch 70 is reduced, so that the erroneous operation (malfunction) of the driving unit 40 can be prevented and the visual/auditory quality of its operational state can be improved.

Further, in the embodiment of the present invention, the hinge arm 30 has the driving unit 40 at the other end thereof via the rotational axis (hinge pin 31), and there are provided the bracket 50 which rotatably supports the hinge arm 30 via the rotational support axis (hinge pin 31), the sector gear G1 which is fixed to the bracket 50, and the pinion gear G5 into which the output axis 45 is fitted and which engages with the sector gear G1 (see FIGS. 4 and 7).

According to this structure, a motor power can be transmitted to the hinge arm 30 by engagement of the gears, i.e., the sector gear G1 and the pinion gear G5. Further, by proving the lever 20 at the one end of the hinge arm 30 and providing the driving unit 40 at the other end of the hinge arm 30, the motor 42 can be made to serve as a counterweight against the lever 20.

Moreover, in the embodiment of the present invention, the temporary holding mechanism 80 to temporarily hold the hinge arm 30 at the gripping position of the lever 20 is provided (see FIGS. 8 and 12). According to this structure, since the hinge arm 30 can be temporarily held at the gripping position without continuously driving the motor 42, burden of the motor 42 can be reduced.

Also, in the embodiment of the present invention, both of the hinge arm 30 and the sector gear G1 are provided at the rotational axis (hinge pin 31) (see FIG. 7). According to this structure, positioning of the hinge arm 30 and the sector gear G1 becomes accurate, so that the hinge arm 30 can be driven securely.

Embodiment 2

Figure 13:
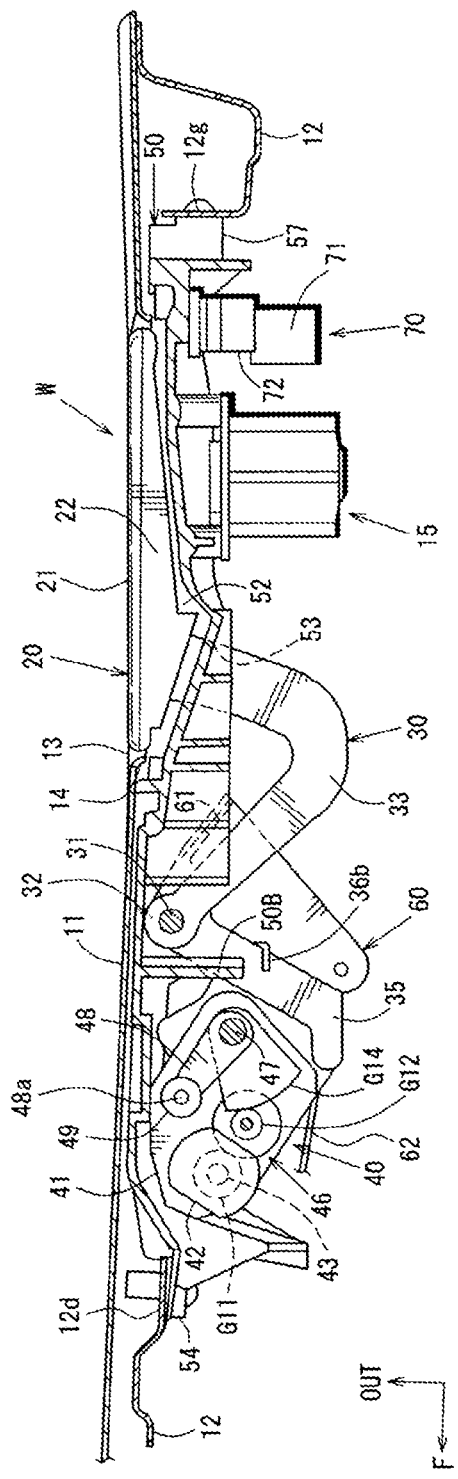
FIG. 13 is a sectional view showing a lever storage state of a second embodiment.
Figure 14:
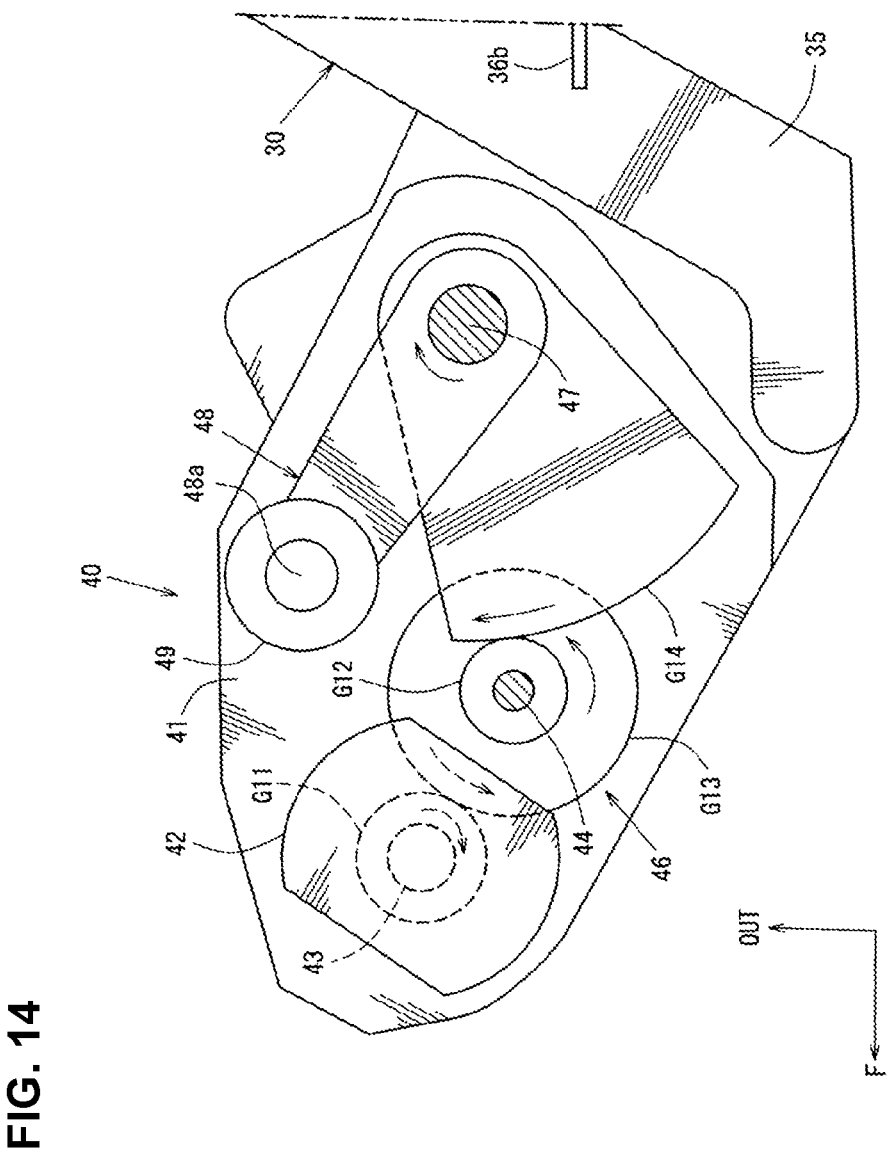
FIG. 14 is a plan view showing the driving unit.
Figure 16:
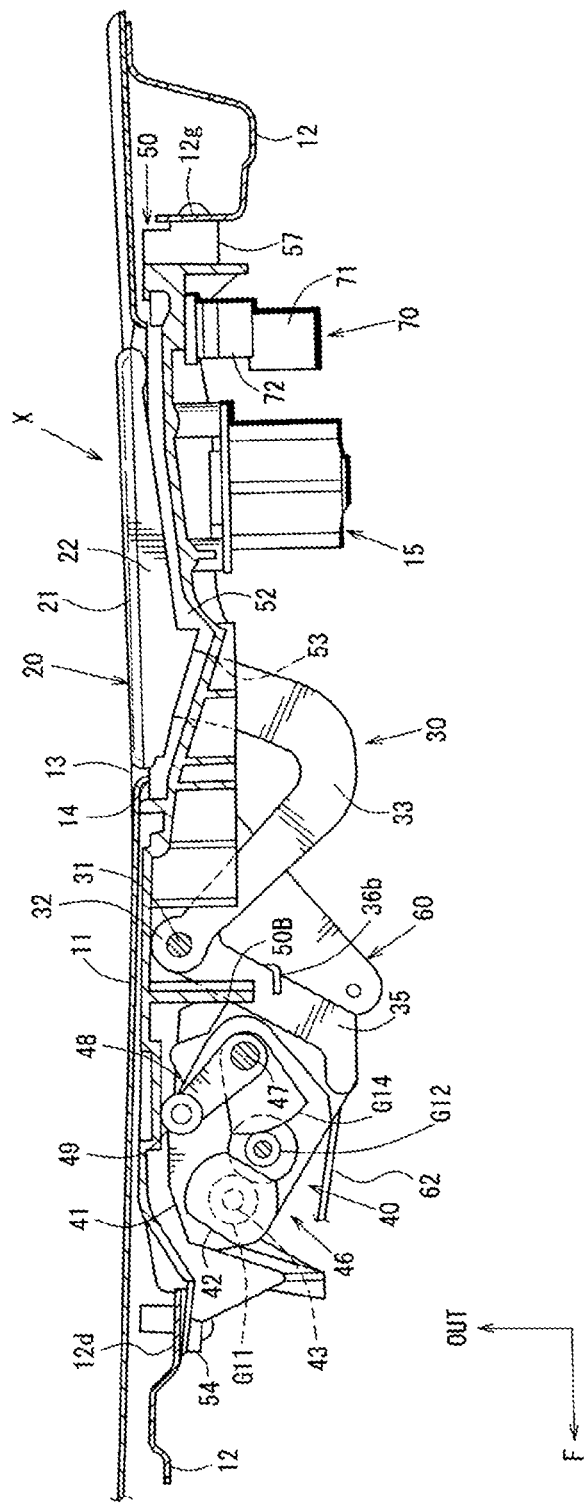
FIG. 16 is a plan view showing a projection initial position of the lever.
Figure 17:
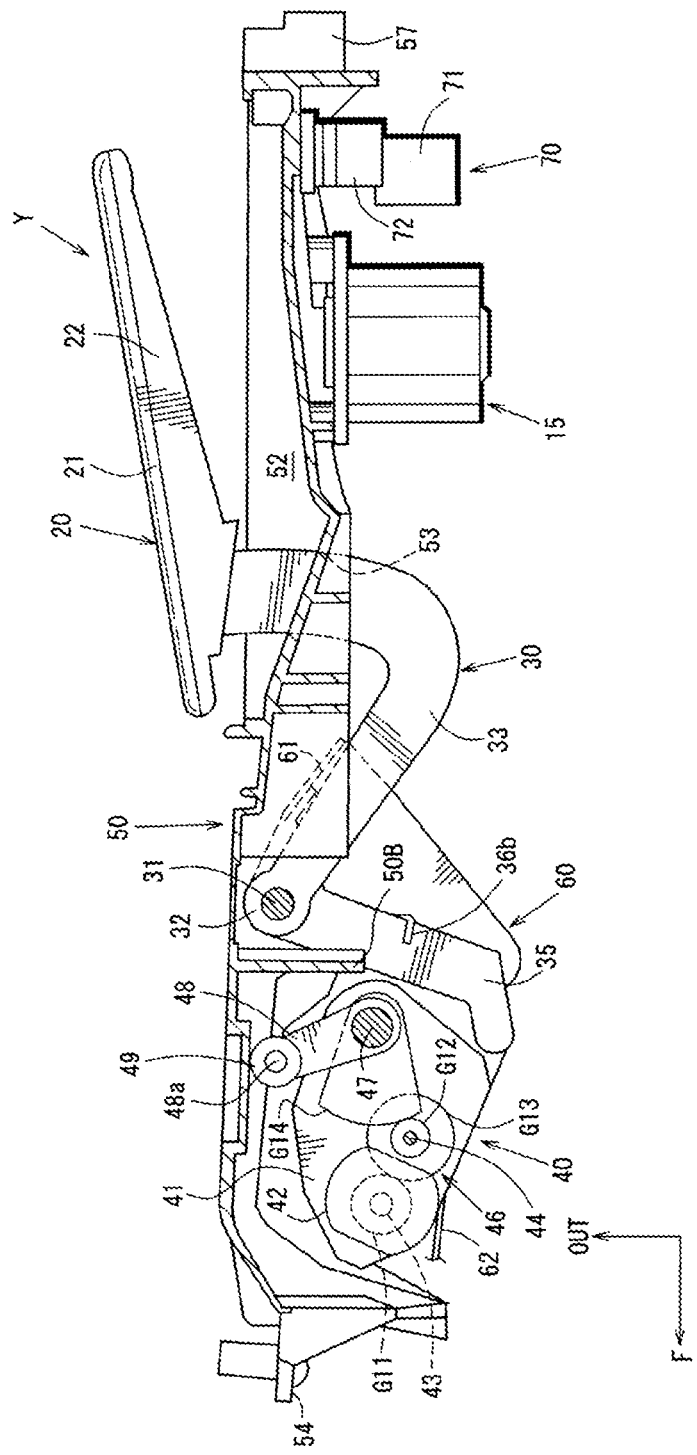
FIG. 17 is a plan view showing the gripping position of the lever.
Figure 18:
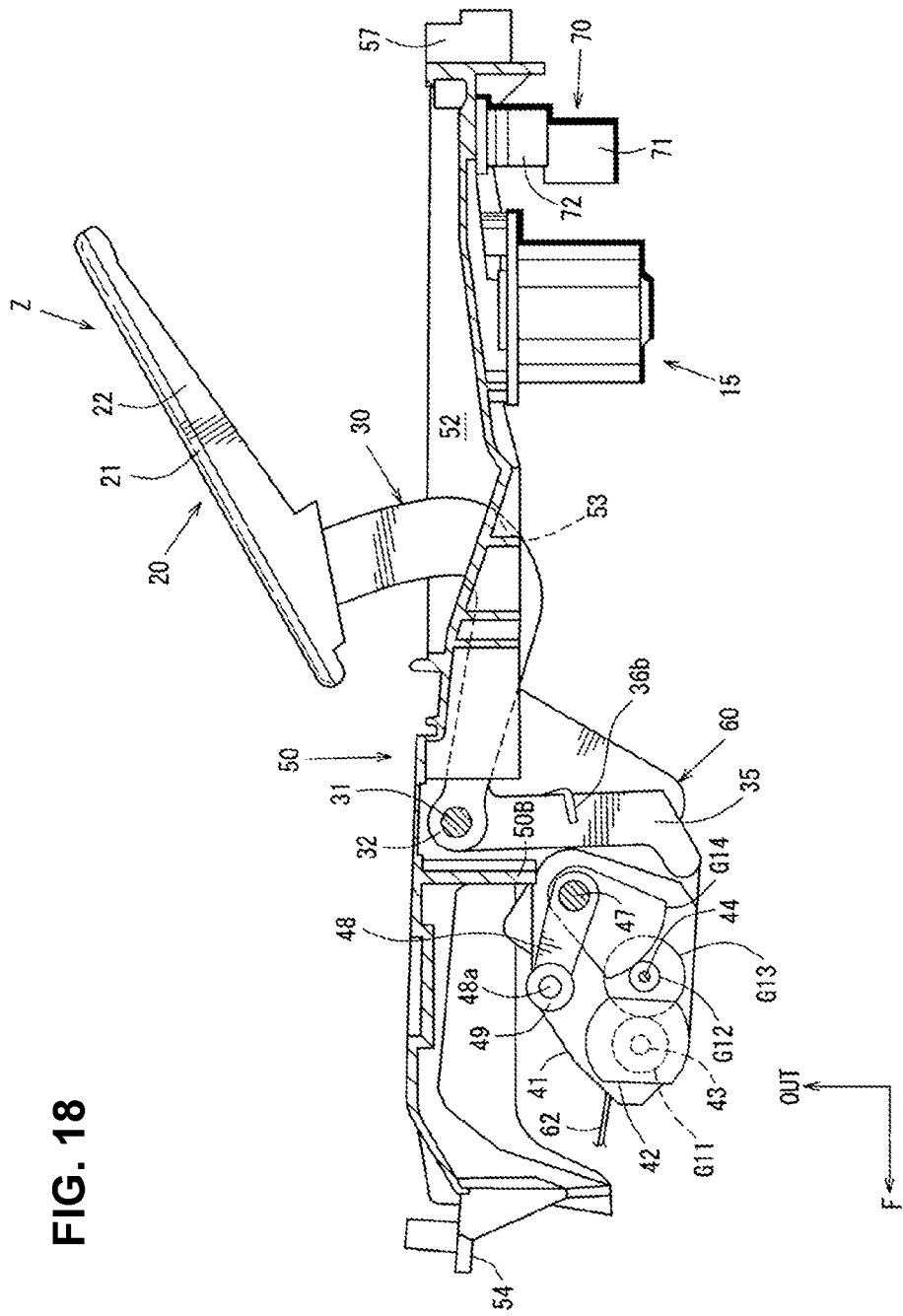
FIG. 18 is a plan view showing the open position of the lever.
Figure 19:
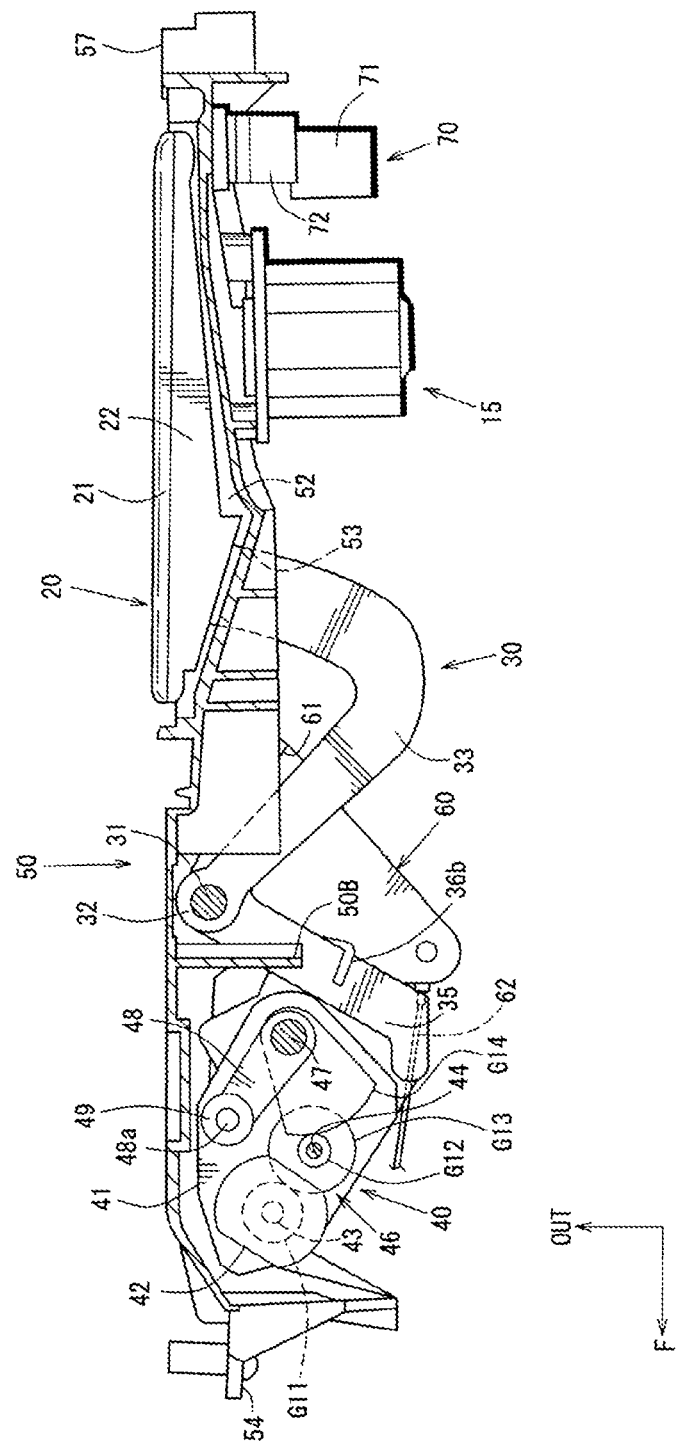
FIG. 19 is a plan view showing a switch pushing position of the lever.

Next, a second embodiment of the door handle structure of the vehicle will be described referring to FIGS. 13-22. FIG. 13 is a sectional view showing a lever storage state of the second embodiment, FIG. 14 is a plan view showing the driving unit, FIG. 15 is a plan view showing a biasing structure by means of the biasing mechanism, FIG. 16 is a plan view showing a projection initial position of the lever, FIG. 17 is a plan view showing the gripping position of the lever, FIG. 18 is a plan view showing the open position of the lever, and FIG. 19 is a plan view showing a switch pushing position of the lever.

Figure 20:
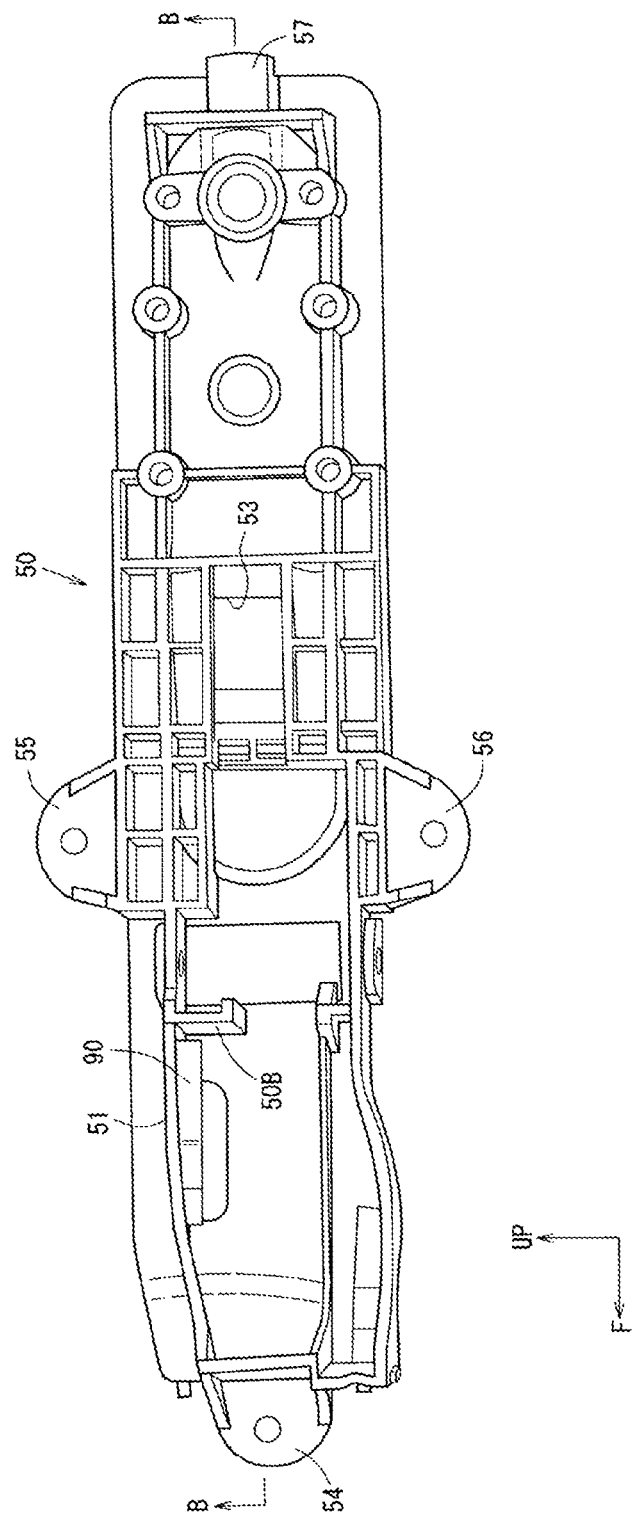
FIG. 20 is an inner side view of the bracket.
Figure 21:
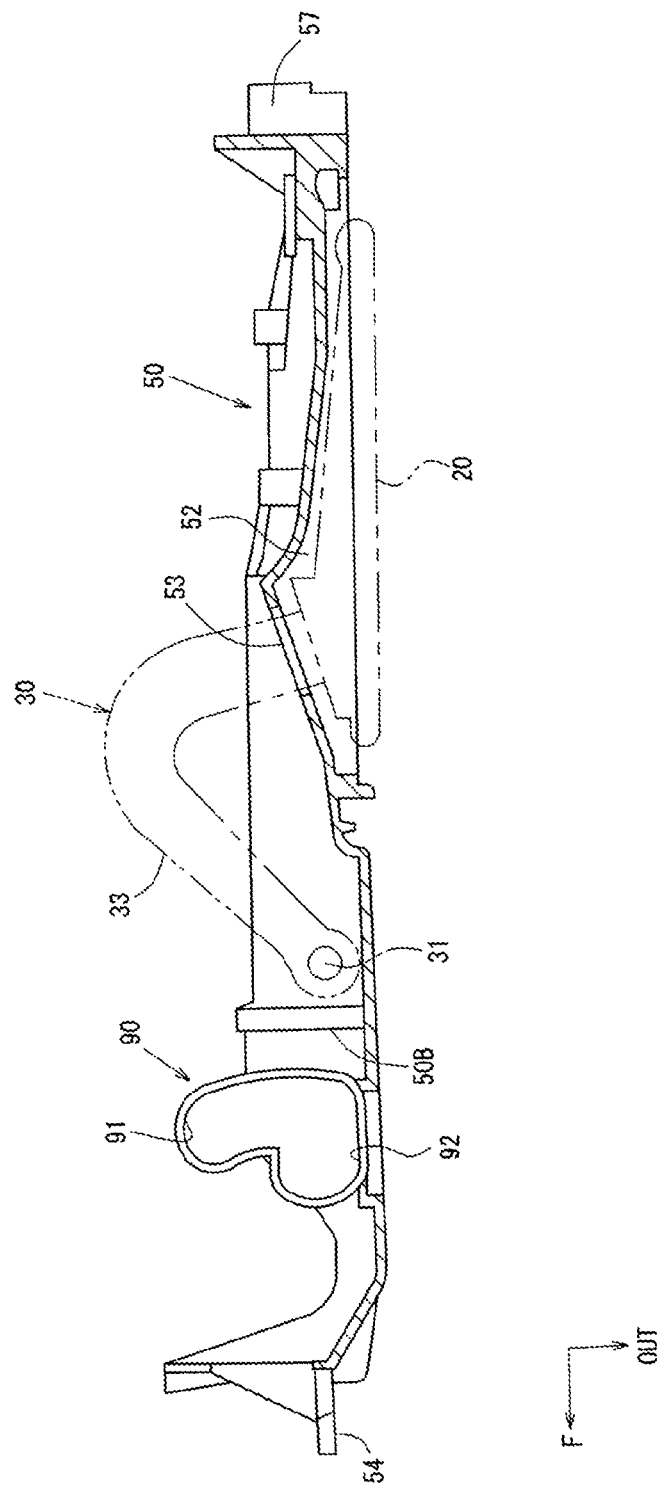
FIG. 21 is a sectional view taken along line B-B of FIG. 20.
Figure 22:
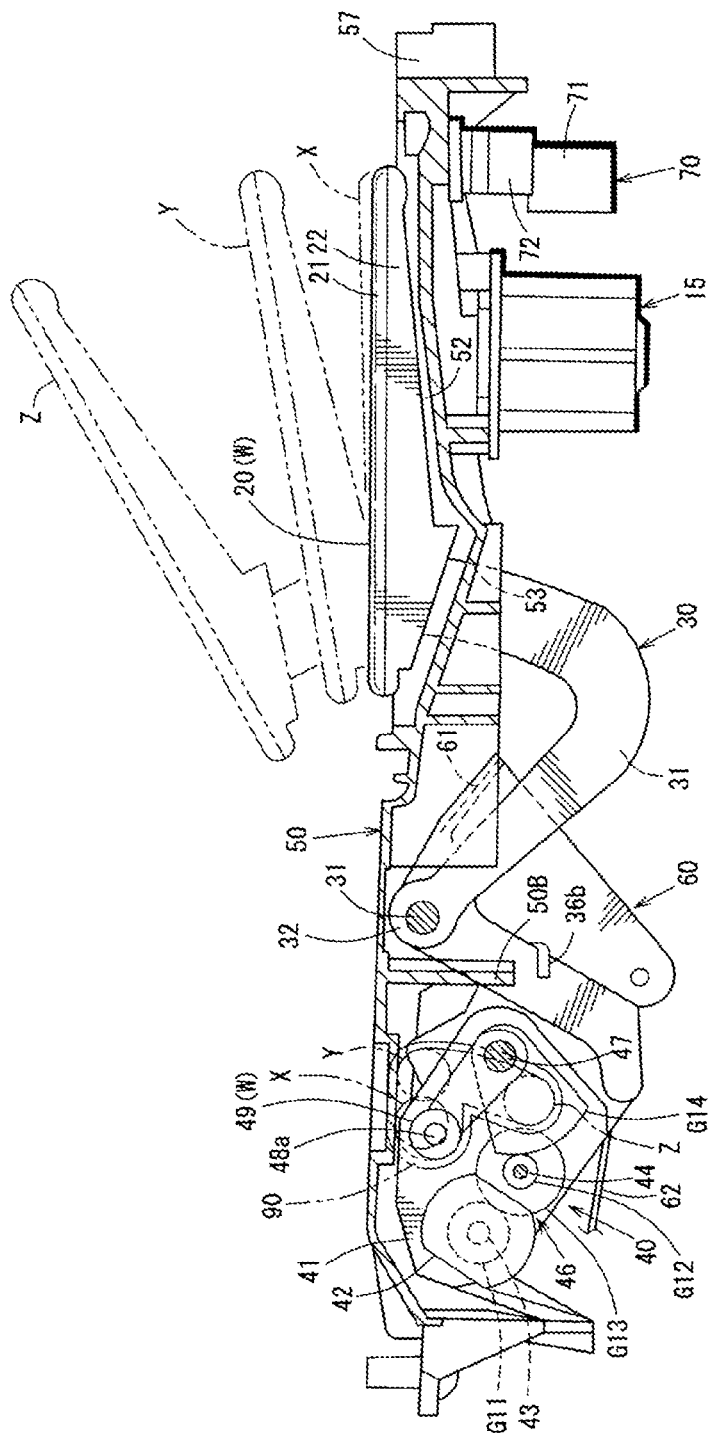
FIG. 22 is an explanatory diagram showing a moving path of the lever, the hinge arm, and a slide member.

Further, FIG. 20 is an inner side view of the bracket, FIG. 21 is a sectional view taken along line B-B of FIG. 20, and FIG. 22 is an explanatory diagram showing a moving path of the lever, the hinge arm, and a slide member. In FIGS. 13-22, the same elements as the structures shown in the previous figures are denoted by the same reference characters and their specific descriptions are omitted here.

Figure 15:
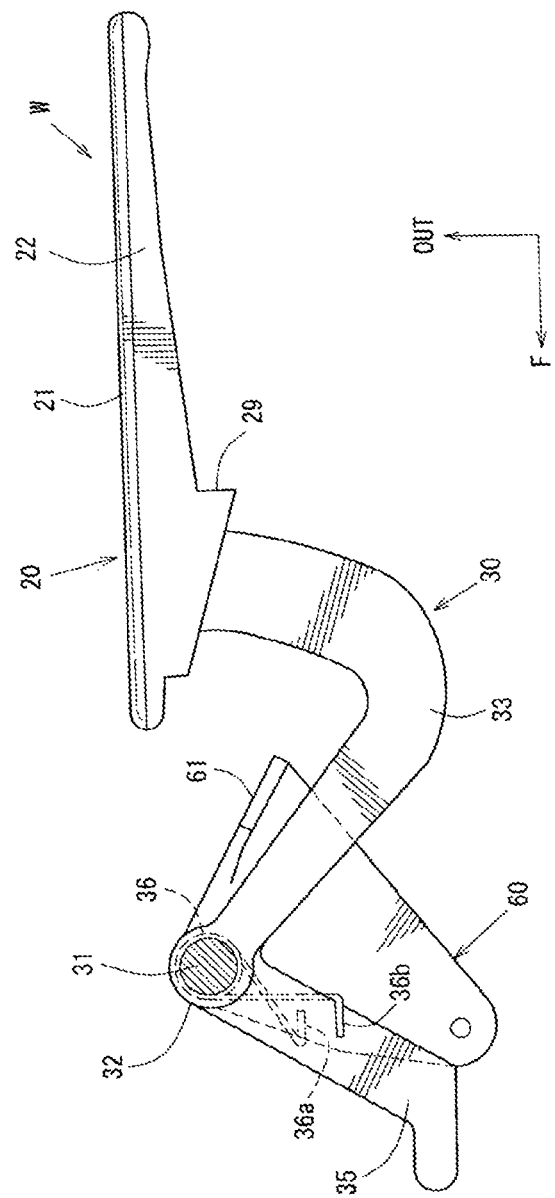
FIG. 15 is a plan view showing a biasing structure by means of a biasing mechanism.

As shown in FIG. 15, the torsion spring 36 as the biasing mechanism is wound around the hinge pin 31, and one end 36a of the torsion spring 36 engages with the crank plate 60 and the other end 36b of the torsion spring 36 engages with the extension portion 35 of the hinge arm 30. Thereby, the lever 20 is always biased in its storage direction by means of the torsion spring 36. A spring force of this torsion spring 36 is set to be smaller than that of the coil spring (not illustrated) which biases the crank plate 60 in the anti-release direction.

Next, a structure of the driving unit 40 to transmit the drive force to the other side (see the extension portion 35) of the hinge arm 30 will be described referring to FIG. 14. The motor 42 is attached to the above-described motor base 41. The rotational axis 43 of the motor 42 is fitted into an output gear G11. A driven gear G13 having a pinion gear G12 is provided at the axis 44 which is provided at the motor base 41. Further, a sector gear G14 is provided at an output axis 47 which is provided at the motor base 41.

As shown in FIG. 14, the output gear G11 engages with the driven gear G13. The pinion gear G12 engages with the sector gear G14. Accordingly, when the motor 42 is driven and thereby its rotational axis 43 and the output gear G11 are rotated in a clockwise direction in FIG. 14, the sector gear G14 and the output axis 47 are rotated in the clockwise direction via the respective gears G11, G13, the axis 44, and the gear G12 which are arranged in this order.

The above-described output axis 47 is an axis where the rotational force of the motor 42 is transmitted via a gear train 46 comprising the respective elements G11-G14. The above-described output axis 47A is fixedly fitted into a base end of a crank 48. A roller 49 as the slide member is rotatably provided at an axis portion 48a which is provided at a free end of the crank 48.

As shown in FIGS. 20, 21 and 22, in order that the roller 49 guides a moving path of the lever 20 from a storage position W (see FIG. 13) to an open position Z (see FIG. 18) by way of a projection initial position X (see FIG. 16) and a gripping position Y (see FIG. 17), a ring-shaped guide rib 90 as a guide portion extending downwardly from an upper wall 51 of the bracket 50 is integrally formed at this upper wall 51.

The above-described guide rib 90 has a ring-shaped groove portion 91 to guide the above-described roller 49 along its moving path inside thereof. As shown in FIG. 21, at an outermost end, in the vehicle width direction, of the guide rib 90 is formed a contact portion 92 which the roller 49 contacts for sliding the free end of the crank 48.

Further, the above-described bracket 50 has a vertical wall 50B as a crank-direction changing portion to change a direction of the crank 48 toward the lever storage position W (see FIG. 13) when the lever 20 is moved from the gripping position Y (see FIG. 17) to the opening position Z (see FIG. 18).

Herein, the above-described contact portion 92 is a wall portion which extends in the vehicle longitudinal direction, the above-described vertical wall 50B is a wall portion which extends in the vehicle width direction in back of the contact portion 92, and the guide rib 90 including the contact portion 92 and the vertical wall 50B are integrally formed at the bracket 50.

When the driving unit 40 drives the motor 42, the motor rotational force is transmitted to the output axis 47 via the gear train 46 and thereby the crank 48 is rotated in the clockwise direction in FIGS. 13 and 14. Accordingly, the hinge arm 30 is rotated in the lever projection direction via the motor base 41 and the extension portion 35 by a strut (bracing) force of the crank 48 from a point when the roller 49 at the free end of the crank 48 contacts the contact portion 92 of the guide rib 90.

The lever 20 is configured to be rotatable among the storage position W (see FIG. 13) where its outer cover 21 is flush with the door outer panel 11, the gripping position Y (see FIG. 17) where the whole part of the design surface of the lever 20 which is flush with the door outer panel 11 in the storage position W is projected from the door outer panel 11 by the driving unit 40 so that the user is able to grip the lever 20, and the open position Z (see FIG. 18) where the lever 20 is further projected from the gripping position Y.

The lever 20 can be rotated by the driving unit 40 in a region from the storage position W shown in FIG. 13 to the gripping position Y shown in FIG. 17. Further, in a region where the hinge arm 30 moves from the storage position W shown in FIG. 13 to the gripping position Y shown in FIG. 17, the crank plate 60 does not move but is biased in the anti-release direction by the coil spring (not illustrated) having the strong spring force.

Since the lever 20 is projected outwardly from the door outer panel 11 so that the user can grip the lever 20 in the gripping position Y shown in FIG. 17, the user can open the lever 20 to the open position Z shown in FIG. 18 from the gripping position Y shown in FIG. 17.

As shown in FIG. 17, when the hinge arm 30 reaches the gripping position Y, the neck portion 33 of the hinge arm 30 contacts the vertical wall 61 of the crank plate 60. Therefore, when the lever 20 is operationally rotated in the open direction of the lever 20 against the spring force of the coil spring, not illustrated, the crank plate 60 is moved in the release direction, so that the door latch is released via the release wire 62.

When the lever 20 is moved from the gripping position shown in FIG. 17 to the open position Z shown in FIG. 18, the direction of the crank 48 is changed to the lever storage position by the vertical wall 50B as the crank-direction changing portion which the projection portion 48b of the crank 48 contacts, so that the roller 49 at the free end of the crank 48 gets away inwardly, in the vehicle width direction, from the contact portion 92 of the guide rib 90 as shown in FIG. 18.

Herein, as shown in FIG. 19, since the lever 20 is configured to be rotatable relative to the lever support portion of the hinge arm 30, when the rear end portion of the lever 20 taking the storage position W is pushed from the outward side, the rear end portion of the lever 20 swings inwardly, in the vehicle width direction, thereby taking the switch pushing position where the switch 70 is turned ON.

As described above, the door handle structure of the vehicle of the second embodiment shown in FIGS. 13-22 also comprises the hinge arm 30 having the lever 20 which is retractable from the door panel (door outer panel 11) at the one end thereof and the rotational axis (hinge pin 31) to rotate the lever 20 so as to be projected from the door panel (door outer panel 11), and the driving unit 40 to transmit the drive force to the hinge arm 30 so as to project the lever 20 from the door panel (door outer panel 11), wherein the lever 20 is configured to be rotatable among the storage position W (see FIG. 13) where the lever 20 is flush with the door panel (door outer panel 11), the gripping position Y (see FIG. 17) where the lever 20 is projected from the door panel (door outer panel 11) by the driving unit 40 so that the user is able to grip the lever 20, and the open position Z (see FIG. 18) where the lever 20 is further projected from the gripping position, the lever 20 is biased in the storage direction by the biasing mechanism (torsion spring 36) which is provided at the rotational axis (hinge pin 31), the switch 70 which is electrically connected to the driving unit 40 is provided to closely face the vehicle inward side of the lever 20 taking the storage position W, the driving unit 40 comprises the motor 42 and the output axis 45 which is connected to the motor 42 and the hinge arm 30 so as to transmit the output of the motor 42 to the hinge arm 30 in a region from the storage position W to the gripping position Y, and the driving unit 40 is configured such that the drive force is transmitted from the motor 42 to the hinge arm 30 via the output axis 45 when the lever 20 is moved from the storage position W to the gripping position Y and the drive force is transmitted from the hinge arm 30 to the motor 42 via the output axis 45 when the lever 20 is moved from the open position Z to the gripping position Y (see FIGS. 13, 14, 16, 17 and 18).

Specifically, in case where the lever 20 is moved from the open position Z to the gripping position Y, the drive force is transmitted to the motor 42 by way of the respective elements 35, 41, 48, 47, G14, G12, 44, G13, 43 shown in FIG. 14 in this order.

According to this structure, similarly to the first embodiment, the drive force is transmitted from the hinge arm 30 to the motor 20 by means of the biasing mechanism (torsion spring 36) via the output axis 45 when the lever 20 is moved from the open position Z (see FIG. 18) to the gripping position Y (see FIG. 17). Thereby, the rotational torque is applied to the motor 42 and the motor 42 is rotated, thereby generating the electrical brake force, so that braking can be applied against the biasing force of the biasing mechanism (torsion spring 36) which biases the lever 20 in the storage direction.

Consequently, the returning speed of the lever 20 when the lever 20 is returned to the storage position is reduced and thereby the load (impact) which is inputted to the switch 70 is reduced, so that the erroneous operation (malfunction) of the driving unit 40 can be prevented and the visual/auditory quality of its operational state can be improved.

Moreover, in the second embodiment of the present invention, the bracket 50 rotatably supporting the hinge arm 30 via the rotational support axis (hinge pin 31) is provided, the driving unit 40 comprises the crank 48 which is fixed to the output axis 47 at the base end thereof and has the slide member (roller 49) at the free end thereof, and the guide portion (guide rib 90) to guide the moving path of the slide member (guide rib 90) is provided at the bracket 50 (see FIGS. 20-22).

According to this structure, since the slide member (roller 49) of the crank 48 is guided by the guide portion (guide rib 90), the slide member (roller 49) moves on the same moving path in the lever projected state where the lever 20 is moved from the storage position W to the open position Z by way of the gripping position Y and in the lever stored state where the lever 20 is moved from the open position Z to the storage position W by way of the gripping position Y. Thereby, the rotational force can be applied to the output axis 47.

The second embodiment shown in FIGS. 13-22 have substantially the same structures, operations, and effects as the first embodiment, and therefore the same elements are denoted by the same reference characters and their specific descriptions are omitted here.

In correspondence of the present invention to the above-described embodiments, the door panel of the present invention corresponds to the door outer panel 11 of the embodiments. Likewise, the rotational support axis corresponds to the hinge pin 31, the biasing mechanism corresponds to the torsion spring 36, the slide member corresponds to the roller 49, and the guide portion corresponds to the guide rib 90. However, the present invention is not limited to the above-described embodiments.

For example, while the above-described embodiments exemplify the door handle structure of the vehicle which is applied to the door of the two-door type of vehicle, this is applicable to a front door, a rear door, a lift gate, or the like of a four-door type of vehicle as well.

As described above, the present invention is useful in the door handle structure of the vehicle in which the door handle lever and the door outer panel are configured to be flush with each other.

What is claimed is:

1. A door handle structure of a vehicle, comprising:
   a hinge arm having a lever which is retractable from a door panel at one end thereof and a rotational axis to rotate the lever so as to be projected from the door panel; and
   a driving unit to transmit a drive force to the hinge arm so as to project the lever from the door panel,
   wherein said lever is configured to be rotatable among a storage position where the lever is flush with the door panel, a gripping position where the lever is projected from the door panel by said driving unit so that a user is able to grip the lever, and an open position where the lever is further projected from said gripping position,
   the lever is biased in a storage direction by a biasing mechanism which is provided at said rotational axis,
   a switch which is electrically connected to said driving unit is provided to closely face a vehicle inward side of the lever taking the storage position,
   said driving unit comprises a motor and an output axis which is connected to said motor and said hinge arm so as to transmit an output of the motor to the hinge arm in a region from the storage position to the open position, and
   said driving unit is configured such that a motor drive force is transmitted from the motor to the hinge arm via said output axis when the lever is moved from the storage position to the gripping position and a hinge arm drive force is transmitted from the hinge arm to the motor via said output axis when the lever is moved from the open position to the gripping position,
   wherein a bracket rotatably supporting the hinge arm via said rotational support axis is provided, said driving unit comprises a crank which is fixed to said output axis at a base end thereof and has a slide member at a free end thereof, and a guide portion to guide a moving path of said slide member is provided at said bracket, and
   a roller as said slide member is rotatably provided at an axis portion which is provided at the free end of said crank, and a ring-shaped guide rib as said guide portion extending downwardly from an upper wall of said bracket is integrally formed at said upper wall of the bracket in order that said roller guides a moving path of said lever from the storage position to the open position by way of the gripping position.

2. The door handle structure of the vehicle of claim 1,
   wherein said hinge arm has said driving unit at the other end thereof via said rotational axis, and
   the door handle structure further comprises a bracket which rotatably supports the hinge arm via said rotational axis, a sector gear which is fixed to said bracket, and a pinion gear into which said output axis is fitted and which engages with said sector gear.

3. The door handle structure of the vehicle of claim 2, wherein a temporary holding mechanism to temporarily hold said hinge arm at the gripping position of the lever is provided.

4. The door handle structure of the vehicle of claim 3,
   wherein said temporary holding mechanism comprises a housing, an arm portion pivotally supported at said housing via a support axis, a roller at one end of said arm portion via a roller axis, and a spring which always biases said roller to a projection direction thereof and is provided between a one-end side of said arm portion and said housing,
   wherein said hinge arm is configured to be temporarily held by said roller and said arm portion when the lever is projected to the gripping position, and the roller is made, by a biasing force of said spring, to project to a recess-shaped curvature portion which is positioned at a middle of the hinge arm to rotate the arm portion.

5. The door handle structure of the vehicle of claim 2, wherein both of said hinge arm and said sector gear are provided at said rotational axis.

6. The door handle structure of the vehicle of claim 1, wherein a temporary holding mechanism to temporarily hold said hinge arm at the gripping position of the lever is provided.

7. The door handle structure of the vehicle of claim 6,
   wherein said temporary holding mechanism comprises a housing, an arm portion pivotally supported at said housing via a support axis, a roller at one end of said arm portion via a roller axis, and a spring which always biases said roller to a projection direction thereof and is provided between a one-end side of said arm portion and said housing, wherein said hinge arm is configured to be temporarily held by said roller and said arm portion when the lever is projected to the gripping position, and the roller is made, by a biasing force of said spring, to project to a recess-shaped curvature portion which is positioned at a middle of the hinge arm to rotate the arm portion.

* * * * *